Fig. 12
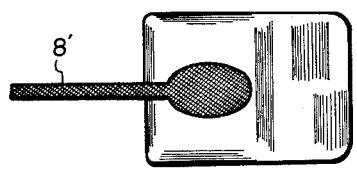
Fig. 13
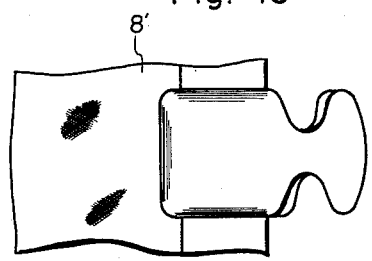
Fig. 16     Fig. 15     Fig. 14
 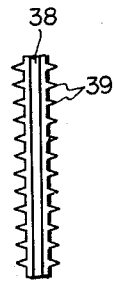 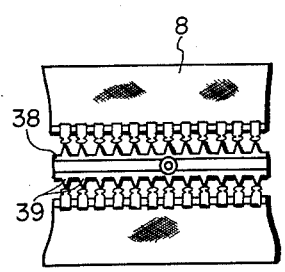

United States Patent Office 3,097,395
Patented July 16, 1963

3,097,395
APPARATUS FOR PRODUCING SLIDE FASTENERS HAVING INTERLOCKING ELEMENTS OF SYNTHETIC RESIN
Tadao Yoshida, Ichikawa-shi, Japan, assignor to Yoshida Kogyo K.K., Tokyo, Japan
Filed July 12, 1961, Ser. No. 123,520
Claims priority, application Japan Jan. 31, 1961
1 Claim. (Cl. 18—30)

The present invention relates to an apparatus for producing slide fasteners having interlocking elements of synthetic resin by continuously forming such interlocking elements on fastener tapes.

The present invention has for its object to provide an apparatus of the kind described which is capable of forming interlocking elements on the fastener tapes with extreme accuracy by employing pinions cooperating with a double rack device to effect differential descending movement for guiding fastener tapes held in a predetermined tension between a split mold, and a take-up roller means, automatically controlled, to effect a two-step winding motion for introducing the fastener tapes accurately into position in the mold.

Another object of the present invention is to provide an apparatus of the kind described arranged for readily removing undesirable runners as well as gates from the interlocking elements formed on the fastener tapes, while the latter is being taken up, by employing a wedge-shaped scraper means provided adjacent to a friction roller over which the fastener chains are delivered.

A further object of the present invention is to provide an apparatus of the kind described which is adapted fully automatically and continuously to operate to form and set interlocking elements on fastener tapes as well as to effect a take-up operation of such fastener tapes with interlocking elements and thus is capable of producing fastener strips at a highly improved efficiency.

These and other objects, advantages and features will be apparent from the following description when read with reference to the accompanying drawings which illustrate more or less schematically a preferred embodiment of the invention. In the drawings:

FIGS. 12 and 13 are fragmentary side and top plan views, respectively, illustrating the configuration of the interlocking elements made of synthetic resin;

FIG. 14 is a fragmentary front view of a pair of unfinished fastener chains immediately after the formation of interlocking elements on the fastener chains;

FIG. 15 is a fragmentary front view of a runner-gate separated from formed interlocking elements; and FIG. 16 is a fragmentary front view showing the configuration of a finished fastener chain.

According to the present invention, an apparatus for continuously and automatically producing slide fasteners having interlocking elements of synthetic resin, comprises a metallic split mold including a pair of metallic mold sections, on movable and the other stationary, each having a multiplicity of generally parallel recesses or cavities formed therein and each corresponding to the shape of interlocking elements, a pair of fastener webbings or tapes of substantial length being intermittently moved through the spacing between the mold sections in two steps while being held in a predetermined tension. A molten mass of synthetic resin is injected into the metallic split mold when closed on the descent of the movable mold section to form rows of interlocking elements while at the same time fusing them onto the fastener tapes held between the mold sections along adjacent longitudinal edges of the tapes. The fastener chains, or the fastener tapes with such interlocking elements formed thereon are separated from the mold sections as the movable mold section is raised. According also to the present invention, a friction roller is provided for directing the fastener chains from the metallic mold and cooperates with a wedge-shaped scraper arranged at a point closely adjacent to the friction roller to effect removal of unnecessary runners and gates unavoidably formed together with the interlocking elements while the faster chains thus finished are successively wound around a take-up roll of the apparatus.

The present invention will be further described with reference to the accompanying drawings from the structural as well as operational standpoint.

Figure 6:
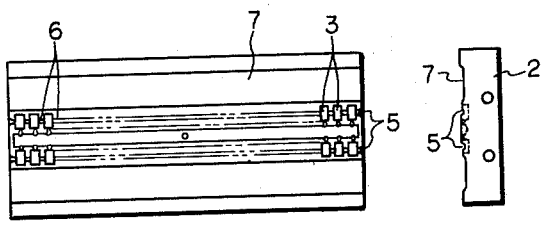
FIGS. 6 and 7 are a plan view and a side elevation, respectively, of the stationary metallic mold section.
Figure 7:
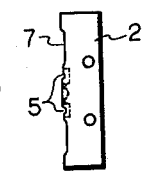
Figure 8:
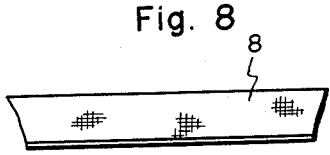
FIGS. 8 and 9 are a fragmentary front view and an end view, respectively, illustrating the configuration of a fastener tape.
Figure 9:

In the drawings, there is shown an apparatus comprising a metal mold which includes a movable mold section 1 adapted to effect intermittent vertical reciprocatory movement by means of an oil hydraulic mechanism and a stationary mold section 2 firmly secured to the machine frame. The mold sections are formed on the respective opposing surfaces with a multiplicity of generally parallel recesses or molding cavities 3 corresponding in configuration to interlocking elements to be molded on fastener tapes. The lower or stationary mold section is also formed with a melt channel 4, as clearly shown in FIGS. 2 and 3. The metal mold sections (FIG. 6) each have on the respective opposing surface a pair of longitudinally extending grooves 6 and a pair of longitudinally extending elongated recesses 7 on opposite sides of the grooves 6, each of said longitudinally extending grooves 6 having rounded edges 5 at opposite ends thereof. It will be recognized that a pair of fastener tapes introduced into the spacing between the metal mold sections 1 and 2 are firmly clamped in place therebetween as the upper mold section 1 is moved to its lowermost position, as shown in FIG. 3, the core cord on each of the fastener tapes being held in a bore defined by a pair of said opposing grooves 6 in the respective mold sections.

Numeral 9 designates a pair of ejector pins slidably mounted in respective vertical bores formed in the movable mold section 1; and numeral 10 designates an abutment member secured to the machine frame for limiting the upward movement of the ejector pins 9 when the upper mold section is raised. The ejector pins 9 are firmly secured in spaced parallel relationship to an ejector plate 12 slidably mounted in a core box 11 integrally formed on top of the upper mold section 1. As the latter rises, each of the ejector pins 9 is raised therewith until its top is brough into abutment against the member 10, after which, as the mold section 1 continues to rise, the bottom of the ejector pin 9 projects downwardly beyond the bottom of the mold section, as will be observed in FIG. 2.

Figure 3:
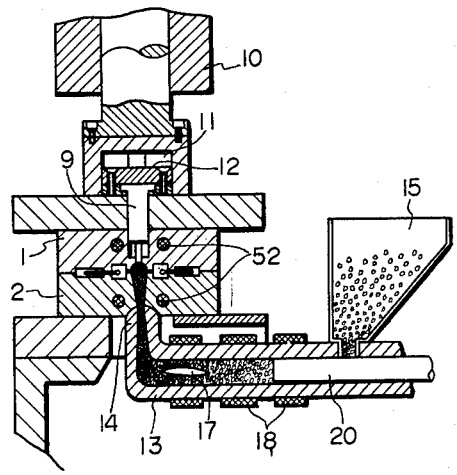
FIG. 3 is a fragmentary cross-sectional view substantially taken along the line A—A in FIG. 2, illustrating in detail the injection molding section of the embodiment.

Numeral 13 designates a tubular melting chamber disposed below the lower mold section 2 for melting synthetic resin material charged into the chamber from a hopper 15 (FIG. 3). The melting chamber 13 has at one end an upwardly directed nozzle 14 which is disposed in communication with the channel 4 formed in the stationary mold section 2. The melting chamber 13 also is provided with a number of heating elements 18 surrounding the chamber and a "torpedo" element 17 disposed in the chamber substantially axially thereof, all of these elements cooperating to melt the material supplied from the hopper 15 into the melting chamber. The material thus molten is forced into the mold cavity by a plunger 20 mounted in the chamber and adapted to move back and forth longitudinally thereof by means of an oil hydraulic mechanism (not shown).

Figure 1:
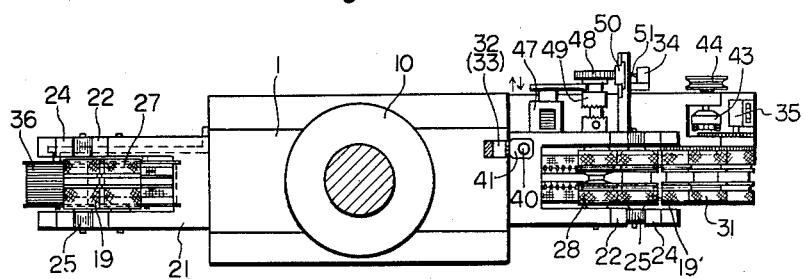
FIG. 1 is a top plan view, partly in section, showing the construction of the embodiment of the invention.
Figure 2:
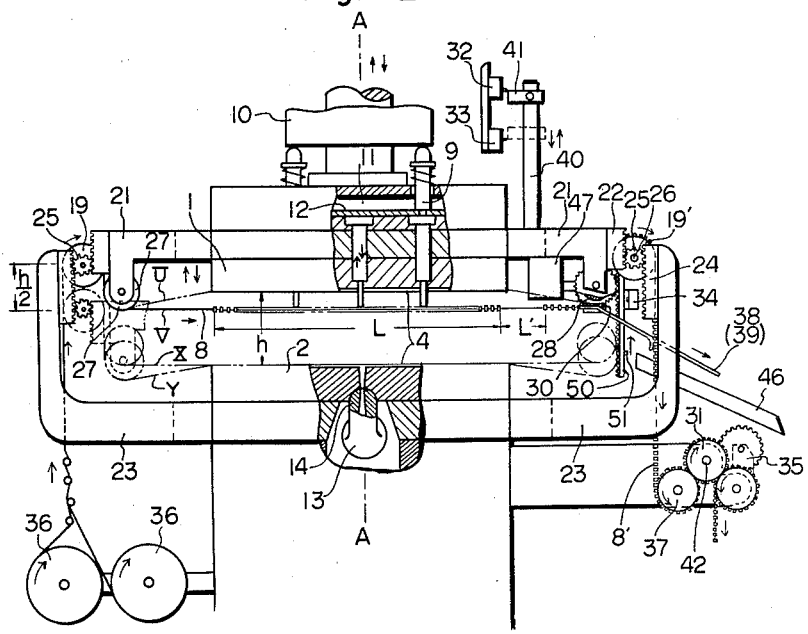
FIG. 2 is a fragmentary front elevational view of the embodiment.

Further, numeral 22 designates a pair of rack members secured to respective brackets 21, which in turn extend laterally in opposite directions from the movable metal mold section 2, which rack members having rack teeth on the outside surface thereof. Similarly, numeral 24 designates a pair of rack members having teeth on respective inside surfaces thereof and secured to brackets 23 extending laterally in opposite directions from the machine frame. A pair of pinions 25 are embraced by said rack members 22 and 24 on respective sides of the apparatus in intermeshing relation thereto, as shown in FIGS. 1 and 2. The pair of pinions 25 are keyed on respective shafts 26, which also carry respective guide wheels 19 and 19' loosely mounted on the shafts 26.

Figure 5:
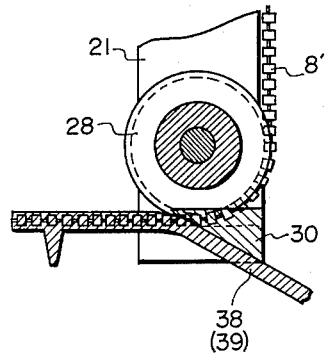
FIG. 5 is a fragmentary cross-sectional view substantially taken along the line B—B in FIG. 4.
Figure 4:
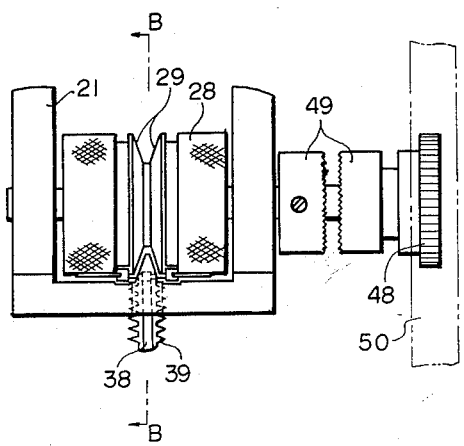
FIG. 4 is a fragmentary side elevational view illustrating the friction roller and scraper on the apparatus in operation.

Provided on the opposite sides of the movable mold section 1 are a guide roller 27 and a friction roller 28, the pair of rollers being rotatably mounted on the side brackets 21 secured to the opposite ends of the mold section so as to extend slightly below the underside of the mold section 1. Provided beneath and closely adjacent to the friction roller 28 is a wedge-shaped scraper element 30 which is secured to the adjacent bracket 21 so as to straddle the friction roller 28. The friction roller 28 has intermediate the ends a V-shaped annular groove 29 formed to receive the apex of the wedge end of the scraper element 30 (FIGS. 4 and 5).

Also provided is a drive roller 31 for winding the fastener tapes. The drive roller 31 is adapted to start by the actuation of limit switches 32 and 33 which are adapted to operate with the vertical reciprocatory movement of the upper or movable mold section 1, and to come to stop by the actuation of a limit switch 34 adapted to be operated through the adjacent rack mechanism by the rotation of the friction roller 28 as well as of an automatic counter device 35 adapted to operate with the rotation of the take-up drive roller 31.

With such arrangement, the fastener tapes or webbings 8 are arranged in tension to extend from a pair of pay-out rolls 36 over the left-hand guide wheel 19, as viewed in FIG. 2, and further over the guide roller 27, friction roller 28, right-hand guide wheel 19 and an intermediate roller 37 toward the drive roller 31. The apparatus with the fastener tapes arranged in this manner operates cyclically in the following sequence, the various devices on the apparatus being operated in respective predetermined control patterns.

Assume that a preceding cycle of operation of forming and setting interlocking elements on the fastener tapes is being completed as the movable mold section 1 rises to its topmost position as shown in FIG. 2. First, the top ends of the ejector pins 9 come to abut against the underside of the stop or abutment member 10 causing the bottom portions of the pins to project downwardly from the underside of the movable mold section 1 to move the fastener chains downwardly relative thereto from the position U to position V in FIG. 2. It is to be understood that the fastener chains 8' have been raised together with the movable mold section 1, a runner and gates 39 formed in the melt channel 4 by the solidification therein of the molten material injected remaining on the pair of fastener chains 8' thus raised. Also, as the upper movable mold section 1 reaches its topmost position, a contactor member 41 mounted on a standard 40 secured to the upper mold section 1 is brought into contact with the upper limit switch 32 to close the latter, which then acts to connect a magnet clutch 43 mounted on the drive shaft 42 carrying the take-up drive roller 31 to an input shaft 45 having a pulley 44 mounted fast thereon for continuous rotation. Consequently, the fastener chains 8' are wound for the length L of the rows of interlocking elements formed on the fastener tapes under control of the automatic counter device 35. On this occasion, as the fastener chains 8' are moved forward by a distance corresponding to the length L the runner 38 and gates 39 integral with a pair of rows of interlocking elements previously formed are moved over the periphery of the friction roller 28 to be scraped or torn off the interlocking elements secured to the fastener tapes downwardly into a chute 46 suitably arranged for directing such scrapings to drop off the apparatus, by the wedging action of the inclined face of the wedge-shaped scraper 30 fitted in the V-shaped groove 29 of the friction roller 28, as clearly shown in FIGS. 4 and 5.

As the automatic counter device 35 comes to stop, the magnet clutch 43 is disengaged to stop rotation of the take-up drive roller 31, and the upper mold section 1 starts to descend to lower the fastener tapes 8 therewith to a position as indicated at x in FIG. 2 so that the bottom surfaces of the tapes 8 come into contact with the top surface of the lower or stationary mold section 2, when the contactor element 41 on the standard 40 actuates the lower limit switch 33, which again energizes the magnet clutch 43 to operate the take-up drive roller 31 while energizing a solenoid 47 (FIGS. 1 and 2) to engage a clutch 49 so that a pinion 48 follows the movement of the friction roller 28. The rotation of the pinion 48 causes the rack element 50 to rise so that a contactor element 51 may be placed into connection with the limit switch 34 after a predetermined period of time has elapsed. Thereupon, the take-up roller 31 operates to wind the fastener chains 8' in excess for a length corresponding to the longitudinal spacing L', between adjacent rows of interlocking elements on the fastener tapes and then comes to stop. During this time, the movable mold section 1 reaches its lowermost position completely to close the metal mold firmly to clamp the fastener tapes 8 between the upper and lower mold sections 1 and 2, as indicated at y in FIG. 2. On completion of the mold closing operation, the injection plunger 20 of the injection molding section starts to operate to force the molten synthetic resin into the mold cavity through the nozzle 14 at the end of the melting chamber so that rows of interlocking elements may be formed and fused onto the adjacent side edges of the fastener tapes 8. The rows of interlocking elements thus formed are solidified with the aid of the flow of cooling water circulating through passages 52 formed in the metal mold 1—2 (FIG. 3) to form fastener chains in a predetermined length of time. The movable mold section 1 then rises with the fastener chains adhering thereto back to the initial top position.

As described above, the feed operation of this apparatus for advancing fastener tapes or chains therethrough is effected by the two-step take-up operation of the take-up drive roller 31, which operates when the upper mold section is in its topmost position and during the descent thereof. Since there are provided, as described hereinbefore, on the opposite sides of the upper movable mold section 1 guide wheels 19 and 19' which are loosely mounted on shafts 26 carrying respective pinions 25 each embraced by and intermeshing with the racks 22 and 24, and such guide wheels 19 and 19' are moved up and down with the rise and fall of the movable mold section 1 by a distance $h/2$ which corresponds to half the distance $h$ of such rising and falling movement of the movable mold section 1, it will be recognized that the fastener tapes extending from the guide roller 27 to the friction roller 28 are held at all times in a predetermined tension and remain absolutely stationary between the two rollers 27 and 28 during the molding operation.

Figure 10:
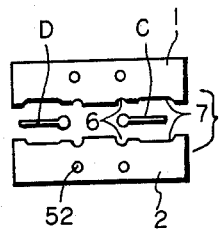
FIG. 10 is a diagrammatic cross-sectional view illustrating the relative position of fastener tapes and the upper and lower metallic mold sections.
Figure 11:
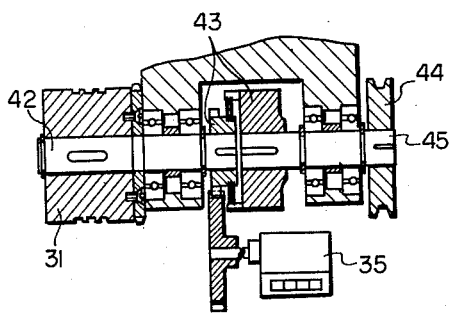
FIG. 11 is a fragmentary cross-sectional view showing the magnet clutch mechanism.

Further, since on the mold closing operation the fastener tapes 8 held in tension between the guide roller 27 and the friction roller 28 are lowered in excess from the position X to the position Y in FIG. 2, it will also be recognized that the fastener tapes may be slid over the rounded edges 5 of the tape cord grooves 6 into position between the mold sections as indicated at C in FIG. 10 with the aid of the lateral movement of the tapes being wound which slid forward across the top surface of the lower stationary mold section, thus eliminating the danger that the tapes be incorrectly positioned between the mold sections as exemplified at D in FIG. 10.

What is claimed is:

An apparatus for producing slide fasteners each including fastener tapes, core cords secured to said respective fastener tapes and rows of interlocking elements of synthetic resin secured thereto in engagement with said respective core cords, said apparatus comprising a molten resin injecting device, a stationary mold section communicating with said injecting device, said stationary mold section including a mold surface, a movable mold section disposed above and opposite to said stationary mold section and adapted to effect intermittent vertical reciprocatory movement relative to said stationary mold section, said movable mold section including a mold surface, said mold surfaces opposing each other, said mold sections each including a pair of spaced longitudinally extending grooves formed in the respective opposing mold surfaces, means for periodically moving said movable mold section in contact with said stationary mold section to clamp said fastener tapes and to define a mold cavity to receive injected molten synthetic resin to form rows of interlocking elements on the fastened tapes in engagement with the core cords, brackets extending generally longitudinally from each of said mold sections at opposite ends thereof, a pair of cooperating racks secured to said respective brackets at either end of said mold sections, a differential pinion embraced by said pair of racks in intermeshing relation therewith, a guide wheel for guiding the fastener tapes loosely mounted on the shaft of said differential pinion, a guide roller and a friction roller mounted on said respective brackets extending from said movable mold section and cooperating with each other to hold the fastener tapes in tension between said mold sections, said friction roller including an annular groove formed therein, a wedge-shaped scraper disposed closely adjacent to said friction roller to fit in said annular groove formed therein for removing runners and gates formed during the molding process integrally with the interlocking elements therefrom as the fastener tapes are moved past said wedge-shaped scraper, and a take-up roller assembly mounted on said stationary mold section and including a drive roller operable in timed relation with said movable mold section to wind the fastener tapes in two steps, during the first step blank portions of the fastener tapes are moved forward nearly into position between said mold sections and during the second step the blank portions are further moved forward just sufficient to ensure that the core cords on the blank portions are fitted completely in said longitudinal extending grooves in said mold sections.

References Cited in the file of this patent

UNITED STATES PATENTS

| | | |
|---|---|---|
| 2,228,145 | Morin | Jan. 7, 1941 |
| 2,543,111 | Kuzmick | Feb. 27, 1951 |
| 2,695,419 | Morin | Nov. 30, 1954 |
| 2,742,670 | Morin | Apr. 24, 1956 |
| 2,811,744 | Baldanza | Nov. 5, 1957 |
| 2,870,483 | Moser | Jan. 27, 1959 |

FOREIGN PATENTS

| | | |
|---|---|---|
| 143,091 | Australia | Aug. 28, 1951 |
| 539,689 | Canada | Apr. 16, 1957 |